US012573251B2

(12) United States Patent
Kuwayama et al.

(10) Patent No.: US 12,573,251 B2
(45) Date of Patent: Mar. 10, 2026

(54) INFORMATION PROCESSING APPARATUS, INFORMATION PROCESSING SYSTEM, INFORMATION PROCESSING METHOD, AND CONTROL APPARATUS

(71) Applicant: TOYOTA JIDOSHA KABUSHIKI KAISHA, Toyota (JP)

(72) Inventors: Yuki Kuwayama, Yokohama (JP); Takeshi Fujiki, Shinagawa-ku (JP); Rie Murai, Chiba (JP); Kohei Miwa, Suntoh-gun (JP); Akira Miyamoto, Nisshin (JP); Tsuyoshi Okada, Nagoya (JP); Yu Ito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 335 days.

(21) Appl. No.: 18/349,508

(22) Filed: Jul. 10, 2023

(65) Prior Publication Data

US 2024/0013595 A1      Jan. 11, 2024

(30) Foreign Application Priority Data

Jul. 8, 2022      (JP) ................................. 2022-110839

(51) Int. Cl.
*G07C 5/08* (2006.01)
*A01B 76/00* (2006.01)
*G05D 1/00* (2006.01)
*G07C 5/00* (2006.01)

(52) U.S. Cl.
CPC ............ *G07C 5/0816* (2013.01); *A01B 76/00* (2013.01); *G05D 1/0212* (2013.01); *G07C 5/008* (2013.01)

(58) Field of Classification Search
CPC ...... G07C 5/0816; G07C 5/008; A01B 76/00; A01B 69/00; G05D 1/0212; G05D 2105/47; G05D 2107/13; G05D 2109/10; G05D 1/225; G06Q 50/02
USPC .......................................................... 701/23
See application file for complete search history.

(56) References Cited

U.S. PATENT DOCUMENTS

| | | | | |
|---|---|---|---|---|
| 10,126,754 | B2 * | 11/2018 | Ogura .................. | A01B 69/008 |
| 11,579,633 | B1 * | 2/2023 | Haslam .................. | B64U 10/13 |
| 2019/0073624 | A1 * | 3/2019 | Schaeffer ........... | G06Q 30/0643 |
| 2019/0261152 | A1 * | 8/2019 | Weinfield ........... | H04B 7/18504 |
| 2020/0113123 | A1 * | 4/2020 | Shearer ................ | A01B 79/005 |
| 2021/0043085 | A1 * | 2/2021 | Kreiling .................... | E02F 3/96 |

FOREIGN PATENT DOCUMENTS

| | | | |
|---|---|---|---|
| CN | 113012446 | * | 6/2021 |
| EP | 3725632 | * | 10/2020 |
| JP | 2001043472 | * | 2/2001 |
| JP | 2011123814 | A | 6/2011 |
| JP | 202111233 | A | 2/2021 |
| JP | 2021-153421 | A | 10/2021 |
| JP | 2021192595 | * | 12/2021 |

* cited by examiner

*Primary Examiner* — Muhammad Shafi
(74) *Attorney, Agent, or Firm* — Oliff PLC

(57) ABSTRACT

An information processing apparatus includes a controller configured to manage a status of a work vehicle. The controller is configured to determine whether the work vehicle is unable to travel based on information about the work vehicle, and provide notification, to a notification target, that the work vehicle is unable to travel in a case in which the work vehicle is determined to be unable to travel.

16 Claims, 4 Drawing Sheets

FIG. 2

INFORMATION PROCESSING APPARATUS, INFORMATION PROCESSING SYSTEM, INFORMATION PROCESSING METHOD, AND CONTROL APPARATUS

CROSS-REFERENCE TO RELATED APPLICATION

This application claims priority to Japanese Patent Application No. 2022-110839, filed on Jul. 8, 2022, the entire contents of which are incorporated herein by reference.

TECHNICAL FIELD

The present disclosure relates to an information processing apparatus, an information processing system, an information processing method, and a control apparatus.

BACKGROUND

Agricultural vehicles with an automatic steering function are known. For example, see Patent Literature (PTL) 1.

CITATION LIST

Patent Literature

PTL 1: JP 2021-153421 A

SUMMARY

Demand exists for rescuing work vehicles that have become unable to travel.

It would be helpful to improve technology for rescuing work vehicles that have become unable to travel.

An information processing apparatus according to an embodiment of the present disclosure includes a controller configured to manage a status of a work vehicle. The controller is configured to determine whether the work vehicle is unable to travel based on information about the work vehicle, and provide notification, to a notification target, that the work vehicle is unable to travel in a case in which the work vehicle is determined to be unable to travel.

An information processing system according to an embodiment of the present disclosure includes the aforementioned information processing apparatus and a control apparatus that is mounted on a work vehicle.

An information processing method according to an embodiment of the present disclosure is executed by an information processing apparatus configured to manage a status of a work vehicle. The information processing method includes determining whether the work vehicle is unable to travel based on information about the work vehicle. The information processing method includes providing notification, to a notification target, that the work vehicle is unable to travel in a case in which the work vehicle is determined to be unable to travel.

A control apparatus according to an embodiment of the present disclosure is for controlling a first work vehicle. In a case in which the first work vehicle is unable to travel, the control apparatus is configured to provide notification to an information processing apparatus that the first work vehicle is unable to travel, the information processing apparatus being configured to manage the first work vehicle.

According to an embodiment of the present disclosure, technology for rescuing work vehicles that have become unable to travel can be improved.

BRIEF DESCRIPTION OF THE DRAWINGS

FIG. 2 is a block diagram illustrating an example configuration of an information processing system according to an embodiment;

DETAILED DESCRIPTION

Hereinafter, an embodiment of the present disclosure will be described.

(Configuration of Information Processing System 1)

Figure 1:
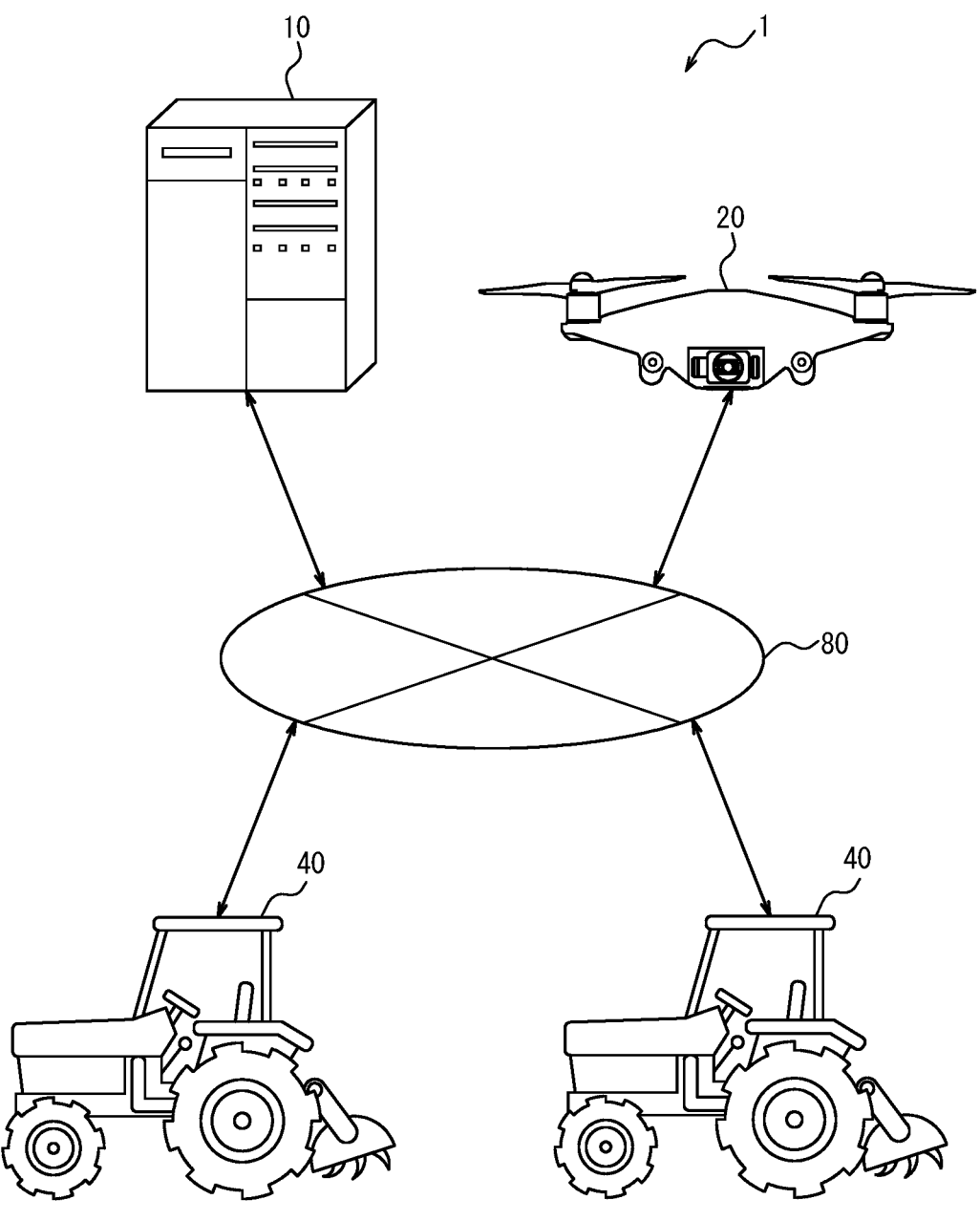
FIG. 1 is a schematic diagram illustrating an example configuration of an information processing system according to an embodiment.
Figure 2:
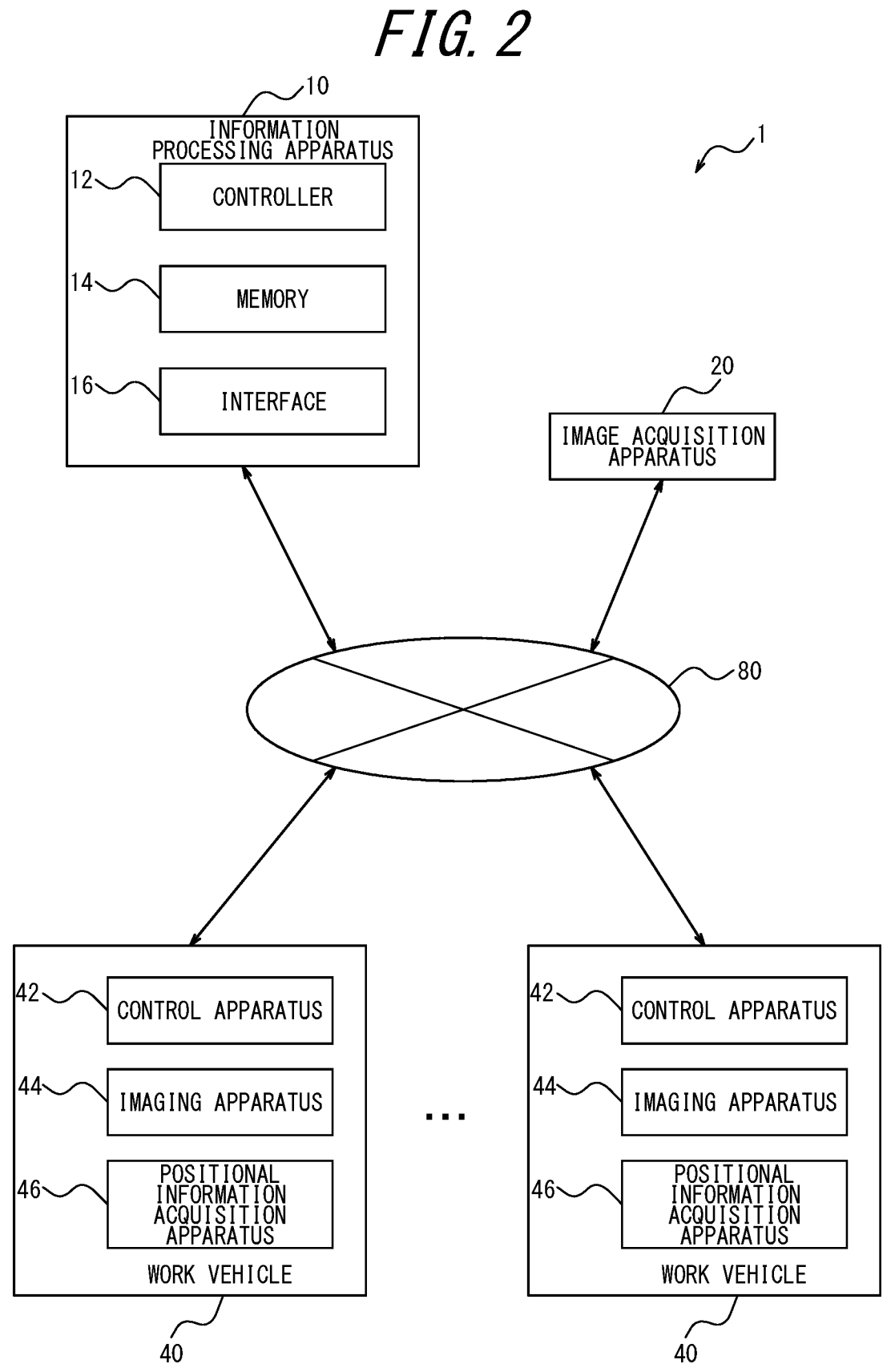

As illustrated in FIGS. 1 and 2, an information processing system 1 according to an embodiment of the present disclosure includes an information processing apparatus 10 and work vehicles 40. The information processing system 1 further includes a non-essential image acquisition apparatus 20. The information processing apparatus 10, the work vehicles 40, and the image acquisition apparatus 20 are communicably connected to a network 80 including, for example, the Internet, a mobile communication network, or the like.

The information processing system 1 manages the status of the work vehicles 40. Configurations of the information processing system 1 are described in detail below. In FIGS. 1 and 2, for ease of explanation, the number of information processing apparatuses 10 and image acquisition apparatuses 20 included in the information processing system 1 is one each, but the number may be two or more. The number of work vehicles 40 is two, but the number may be one or may be three or more. The number of information processing apparatuses 10, image acquisition apparatuses 20, and work vehicles 40 included in the information processing system 1 may be set freely.

<Information Processing Apparatus 10>

The information processing apparatus 10 may, for example, be configured as a computer such as a server apparatus. For example, the information processing apparatus 10 may be configured as a server that belongs to a cloud computing system or other computing systems. The information processing apparatus 10 is not limited to these examples and may be configured to include any general purpose electronic device, such as a personal computer (PC), or may be configured to include any other electronic device that is dedicated to the information processing system 1. The information processing apparatus 10 can communicate with the image acquisition apparatus 20 and the work vehicle 40 via the network 80. In the present embodiment, the information processing apparatus 10 manages the status of the work vehicle 40 based on the images of the work vehicle 40 acquired from the image acquisition apparatus 20 or information on the work vehicle 40 acquired from the work vehicle 40.

As illustrated in FIG. 2, the information processing apparatus 10 includes a controller 12, a memory 14, and an interface 16.

The controller 12 includes at least one processor, at least one dedicated circuit, or a combination thereof. The processor may include a general purpose processor, such as a central processing unit (CPU) or a graphics processing unit (GPU), or a dedicated processor specialized for particular processing. The dedicated circuit may include, for example, a field-programmable gate array (FPGA) or an application specific integrated circuit (ASIC). The controller 12 executes processes related to the operations of the information processing apparatus 10 while controlling the components of the information processing apparatus 10.

The memory 14 includes at least one semiconductor memory, at least one magnetic memory, at least one optical memory, or a combination of at least two of these. The semiconductor memory may, for example, include random access memory (RAM) or read only memory (ROM). The RAM may, for example, include static random access memory (SRAM) or dynamic random access memory (DRAM). The ROM may, for example, include electrically erasable programmable read only memory (EEPROM). The memory 14 functions as, for example, a main memory, an auxiliary memory, or a cache memory. The memory 14 stores programs and data to be used for the operations of the information processing apparatus 10 and data obtained by the operations of the information processing apparatus 10. The information stored in the memory 14 may be updated with, for example, information acquired from the network 80 via the interface 16.

The interface 16 includes at least one interface for external communication that connects to the network 80. The interface for communication may be an interface for either wired or wireless communication. In the case of wired communication, the interface for communication may, for example, include a Local Area Network (LAN) interface or a Universal Serial Bus (USB). In the case of wired communication, the interface for communication may, for example, include an interface compliant with a mobile communication standard such as a Long Term Evolution (LTE), 4th generation (4G), or 5th generation (5G), or an interface compliant with short-range wireless communication such as Bluetooth® (Bluetooth is a registered trademark in Japan, other countries, or both). The interface 16 receives data used in the operation of the information processing apparatus 10 from the image acquisition apparatus 20 or the work vehicle 40 and outputs data obtained by the operation of the information processing apparatus 10 to external apparatuses such as the work vehicle 40.

The interface 16 may further include an input device. The interface 16 may receive input of information with the input device. The input device may be configured with, for example, a touch panel, a touch sensor, or a pointing device such as a mouse. The input device may be configured with a physical key. The input device may be configured with an audio input device, such as a microphone. The input device is not limited to the above examples and may include various other devices.

The interface 16 may further include an output device. The interface 16 may output information with the output device. The output device may include, for example, a display device that outputs visual information, such as images, letters, or graphics. The display device may be configured with, for example, a Liquid Crystal Display (LCD), an organic or inorganic Electro-Luminescent (EL) display, a Plasma Display Panel (PDP), or the like. The display device is not limited to the above displays and may be configured with various other types of displays. The display device may be configured with a light emitting device, such as a Light Emitting Diode (LED) or a Laser Diode (LD). The display device may be configured with various other devices. The output device may include, for example, an audio output device, such as a speaker, that outputs audio information, such as voice. The output device is not limited to the above examples and may include various other devices.

The functions of the information processing apparatus 10 are implemented by execution of a program, according to the information processing method of the present embodiment, by a processor corresponding to the controller 12. That is, the functions of the information processing apparatus 10 are realized by software. The program causes a computer to execute the operations of the information processing apparatus 10, thereby causing the computer to function as the information processing apparatus 10. That is, the computer executes the operations of the information processing apparatus 10 in accordance with the program to thereby function as the information processing apparatus 10.

The program in the present embodiment can be recorded on a computer readable recording medium. The computer readable recording medium includes a non-transitory computer readable medium and is, for example, a magnetic recording apparatus, an optical disc, a magneto-optical recording medium, or a semiconductor memory. The program is distributed, for example, by selling, transferring, or lending a portable recording medium such as a digital versatile disc (DVD) or a compact disc read only memory (CD-ROM) on which the program is recorded. The program may also be distributed by storing the program in a storage of an external server and transmitting the program from the external server to another computer. The program may be provided as a program product.

<Image Acquisition Apparatus 20>

The image acquisition apparatus 20 is configured to include various cameras that capture images and thus acquires various images of the work vehicle 40. The image acquisition apparatus 20 may be configured to include various sensors, such as a distance measuring sensor that generates a distance image from the distance to an object or a temperature sensor that generates a temperature image from temperature data of the object. The image acquisition apparatus 20 may be configured as a drone or other flying object on which a camera or sensor is mounted. The image acquisition apparatus 20 may be configured as a robot or the like on which a camera or sensor is mounted.

<Work Vehicle 40>

The work vehicles 40 may include agricultural vehicles for performing agricultural work. The agricultural vehicles may include, for example, tractors. In greater detail, the agricultural vehicles may include vehicles that sow seeds or plant seedlings. The agricultural vehicles may include vehicles that cut and harvest crops or vehicles that dig up and harvest crops. The work vehicles 40 are not limited to agricultural vehicles and may include vehicles that perform a variety of other tasks. The work vehicles 40 may include vehicles powered by gasoline, light or heavy oil, or the like. The work vehicles 40 may include an electric vehicle such as a Battery Electric Vehicle (BEV), a Hybrid Electric Vehicle (HEV), a Plug-in Hybrid Electric Vehicle (PHEV), or a Fuel Cell Electric Vehicle (FCEV). The work vehicles 40 are not limited to these examples and may include vehicles driven by various other methods. The work vehicles 40 may be a manned vehicle or any autonomous vehicle that travels unmanned.

The work vehicles 40 perform agricultural work in agricultural areas or travel on agricultural roads. Agricultural roads may include public or private roads. The work vehicles 40 are also referred to as agricultural vehicles in the case of performing agricultural work.

As illustrated in FIG. 2, each work vehicle 40 includes a control apparatus 42. The control apparatus 42 includes at least one processor, at least one dedicated circuit, or a combination thereof. The processor may include a general purpose processor, such as a CPU or a GPU, or a dedicated processor that is dedicated to specific processing. Examples of dedicated circuits may include an FPGA and an ASIC. The control apparatus 42 executes processes related to the operations of the work vehicle 40 while controlling the components of the work vehicle 40.

The control apparatus 42 may include a memory. The memory includes one or more memories. The memories are semiconductor memories, magnetic memories, optical memories, or the like, for example, but are not limited to these. The memories included in the memory may each function as, for example, a main memory, an auxiliary memory, or a cache memory. The memory stores any information used for operations of the work vehicle 40. For example, the memory may store a system program, an application program, embedded software, or the like. The information stored in the memory may be updated with, for example, information acquired from the network 80.

The control apparatus 42 may include a communication interface. The communication interface includes at least one interface for external communication that connects to the network 80. The interface for communication is, for example, an interface compliant with a mobile communication standard such as LTE, 4G, or 5G, or an interface compliant with a short-range wireless communication standard such as Bluetooth®, but these examples are not limiting. The communication interface receives data to be used for the operations of the work vehicle 40 and transmits data obtained by the operations of the work vehicle 40 to an external apparatus, such as the information processing apparatus 10.

While not essential, the work vehicle 40 may further include an imaging apparatus 44. The imaging apparatus 44 may be configured to include various cameras that capture images. The imaging apparatus 44 may capture images of the surroundings of the work vehicle 40 or images of the work vehicle 40 itself. The imaging apparatus 44 outputs the captured images to the information processing apparatus 10. The imaging apparatus 44 may output the captured images to the information processing apparatus 10 via the control apparatus 42. The imaging apparatus 44 may be communicably connected to the information processing apparatus 10 via the network 80 and output the captured images directly to the information processing apparatus 10.

The work vehicle 40 further includes a non-essential positional information acquisition apparatus 46. The positional information acquisition apparatus 46 includes at least one apparatus for acquiring positional information for the work vehicle 40. Specifically, the positional information acquisition apparatus 46 includes a receiver corresponding to the Global Positioning System (GPS), for example, but is not limited to this, and may include a receiver corresponding to any satellite positioning system. The positional information acquisition apparatus 46 may continuously acquire, or may periodically or non-periodically acquire, the positional information for the work vehicle 40. The positional information acquisition apparatus 46 outputs the positional information for the work vehicle 40 to the information processing apparatus 10. The positional information acquisition apparatus 46 may output the positional information for the work vehicle 40 to the information processing apparatus 10 via the control apparatus 42. The positional information acquisition apparatus 46 may be communicably connected to the information processing apparatus 10 via the network 80 and output the positional information for the work vehicle 40 directly to the information processing apparatus 10.

The work vehicle 40 may further include a drive unit. The drive unit includes the drive mechanisms related to the movement or travel of the work vehicle 40. The drive unit includes the drive mechanisms related to the operations for the work performed by the work vehicle 40. The drive unit may, for example, include a rotating mechanism, sliding mechanism, or the like driven by a motor, engine, or the like.

The work vehicle 40 may further include a detector. The detector may be configured to detect the actual movement of the drive unit or other component of the work vehicle 40. The detector may, for example, be configured to detect the acceleration of various parts of the work vehicle 40. The detector may, for example, be configured to detect forces acting on each part of the work vehicle 40. The detector is not limited to these examples and may be configured to detect various parameters, including physical quantities related to the operation of the work vehicle 40. The detector may output the result of detection to the control apparatus 42. The detector may output the result of detection to the information processing apparatus 10.

(Operation Example of Information Processing System 1)

In the information processing system 1 according to the present embodiment, the information processing apparatus 10 may manage the state of the work vehicle 40 as an agricultural vehicle when the work vehicle 40 is performing agricultural work in an agricultural area. The information processing apparatus 10 may manage the status of the work vehicle 40 when the work vehicle 40 is performing work other than agricultural work. The information processing apparatus 10 may manage the status of the work vehicle 40 when the work vehicle 40 is traveling in an agricultural area or on private roads such as agricultural roads. The information processing apparatus 10 may manage the status of the work vehicle 40 when the work vehicle 40 is traveling on public roads. Below, an example of the operation of the information processing apparatus 10 when managing the status of a work vehicle 40 as an agricultural vehicle is described.

<Acquisition of Work Vehicle Information>

The controller 12 of the information processing apparatus 10 acquires information about the work vehicle 40. The information about the work vehicle 40 is also referred to as work vehicle information. The controller 12 may, for example, acquire images of the work vehicle 40 captured by the image acquisition apparatus 20 as the work vehicle information. The controller 12 may, for example, acquire images of the surroundings of the work vehicle 40, or images of the work vehicle 40 itself, captured by the imaging apparatus 44 of the work vehicle 40 as the work vehicle information. The controller 12 may, for example, acquire positional information for the work vehicle 40 as the work vehicle information. The controller 12 may, for example, acquire control information for the work vehicle 40 issued by the control apparatus 42 of the work vehicle 40 as the work vehicle information. The control information for the work vehicle 40 may include information for controlling the output of the drive unit when driving the work vehicle 40 or causing the work vehicle 40 to perform work. The control information for the work vehicle 40 may include the actual output of the drive unit of the work vehicle 40 or the results of detecting the actual acceleration and the like of each part of the work vehicle 40.

The controller 12 may control the image acquisition apparatus 20 to capture images of the work vehicle 40. For example, in a case in which the image acquisition apparatus 20 is configured as a mobile object, such as a drone or robot, the controller 12 may control the image acquisition apparatus 20 to approach the work vehicle 40 based on the positional information for the work vehicle 40 and to capture images of the work vehicle 40. The controller 12 may control the image acquisition apparatus 20 to circulate within the range over which the work vehicle 40 performs work such as agricultural work. The range over which the work vehicle 40 performs work is also referred to as the target work range. The controller 12 may acquire images of the work vehicle 40 by controlling the image acquisition apparatus 20 to capture images at the location of the work vehicle 40. The controller 12 may control the image acquisition apparatus 20 to capture images within the target work range regardless of the presence of the work vehicle 40 and may extract images of the work vehicle 40 from the images captured by the image acquisition apparatus 20.

<Determination of Status of Work Vehicle 40>

The controller 12 determines whether the work vehicle 40 is unable to travel based on the work vehicle information. The controller 12 may, for example, determine that the work vehicle 40 is unable to travel based on the positional information for the work vehicle 40 and the control information for the work vehicle 40 in a case in which the work vehicle 40 is stopped despite the work vehicle 40 being controlled to increase the output of the drive unit. The controller 12 may, for example, determine that the work vehicle 40 is unable to travel based on images of the work vehicle 40 in a case in which the drive unit is not moving or the position of the work vehicle 40 is not changing despite the work vehicle 40 being controlled to increase the output of the drive unit.

The controller 12 may determine whether the work vehicle 40 became unable to travel while traveling on a public road. The controller 12 may determine whether the work vehicle 40 became unable to travel while traveling off a public road (on a private road). The controller 12 may determine whether the work vehicle 40 became unable to travel while working. Vehicles off public roads are more difficult to monitor than vehicles on public roads. According to the information processing system 1 of the present embodiment, monitoring of work vehicles 40 off public roads can be facilitated.

In a case in which the work vehicle 40 is an agricultural vehicle, the controller 12 may determine whether the agricultural vehicle became unable to travel. It is more difficult to monitor agricultural vehicles in agricultural areas where agricultural vehicles work, since it is more difficult to install monitoring equipment than on public roads and the like. According to the information processing system 1 of the present embodiment, monitoring of agricultural vehicles can be facilitated.

In a case in which a work vehicle 40 that is unable to travel is detected, the controller 12 may estimate conditions when the work vehicle 40 became unable to travel based on the corresponding work vehicle information. The controller 12 may, for example, estimate whether the work vehicle 40 became unable to travel while performing work, or whether the work vehicle 40 became unable to travel while traveling. The controller 12 may estimate whether the work vehicle 40 became unable to travel on a public road or off public roads.

As the conditions when the work vehicle 40 became unable to travel, the controller 12 may estimate the cause of the work vehicle 40 becoming unable to travel. For example, the controller 12 may estimate whether the work vehicle 40 became unable to travel due to tilting or overturning. The controller 12 may, for example, estimate whether the work vehicle 40 became unable to travel due to a wheel coming off. The controller 12 may, for example, estimate whether the work vehicle 40 became unable to travel due to the work vehicle 40 running onto another object, causing the wheels to spin. The controller 12 may, for example, estimate whether the work vehicle 40 became unable to travel due to collision with any of various objects, such as a fallen tree, falling rocks, wildlife, or other natural objects, or a concrete block, another vehicle, or other artificial objects.

The controller 12 may estimate the rescue tool needed to rescue the work vehicle 40 that is unable to travel based on the work vehicle information. The controller 12 may estimate the type, number, and the like of the required rescue tools.

<Response to Work Vehicle 40 that is Unable to Travel>

In a case in which the work vehicle 40 is determined to be unable to travel, the controller 12 provides notification, to a notification target, that the work vehicle 40 is unable to travel. The controller 12 may provide notification, to the notification target, of the result of estimating the conditions in which the work vehicle 40 became unable to travel.

The notification target may include a person such as the owner, manager, person in charge, or concerned party of the work vehicle 40. The notification target may include a person such as a person in charge at a corporation that owns or manages the work vehicle 40. The notified person may arrange for the rescue tool needed to rescue the work vehicle 40 that is unable to travel. The notified person may arrange for a rescue vehicle to rescue the work vehicle 40 that is unable to travel. In this way, rescue or another such response can be achieved quickly or easily for a work vehicle 40 that is unable to travel. Consequently, technology for rescuing a work vehicle 40 that has become unable to travel can be improved.

The rescue vehicle may include, for example, another work vehicle 40 located less than a predetermined distance from the work vehicle 40 that is unable to travel. Rescue vehicles may, for example, include work vehicles 40 previously registered as rescue vehicles. Rescue vehicles are not limited to the same type of work vehicle 40 as the work vehicle 40 that is unable to travel and may include a variety of other work vehicles 40. Rescue vehicles are not limited to the work vehicle 40 and may include a variety of other vehicles.

The controller 12 may cause a rescue tool for the work vehicle 40 that is unable to travel to be transported by another work vehicle 40 to the position at which the work vehicle 40 became unable to travel. The controller 12 may cause the rescue tool to be transported by a rescue vehicle. In this way, rescue or another such response can be achieved quickly or easily for a work vehicle 40 that is unable to travel. Consequently, technology for rescuing a work vehicle 40 that has become unable to travel can be improved.

The controller 12 may provide notification that the work vehicle 40 became unable to travel directly to the rescue vehicle as the notification target. The controller 12 may provide notification, that the work vehicle 40 is unable to travel, to a rescue vehicle that is another work vehicle 40 located less than a predetermined distance from a position at which the work vehicle 40 became unable to travel. The controller 12 may provide notification, that the work vehicle 40 is unable to travel, to a rescue vehicle that is another work vehicle 40 registered in advance.

The controller 12 may control the rescue vehicle to move to the position at which the work vehicle 40 became unable to travel. In a case in which the rescue vehicle includes the control apparatus 42, the controller 12 may output information to the control apparatus 42 instructing the control apparatus 42 where to move the rescue vehicle. In this way, rescue or another such response can be achieved quickly or easily for a work vehicle 40 that is unable to travel. Consequently, technology for rescuing a work vehicle 40 that has become unable to travel can be improved.

<Rescue Between Work Vehicles 40>

As described above, in the information processing system 1 according to an embodiment, notification of the fact that a work vehicle 40 is unable to travel may be provided to the notification target by the information processing apparatus 10. In the information processing system 1 according to another embodiment, work vehicles 40 may provide notification to each other that a work vehicle 40 is unable to travel. In this case, the work vehicles 40 themselves can handle the rescuing of a work vehicle 40 that is unable to travel.

Assume that the information processing system 1 includes at least two work vehicles 40, and that the work vehicles 40 are divided into a first work vehicle and a second work vehicle. Here, the descriptions "first" and "second" are merely identifiers to distinguish one configuration from another and have no other special meaning.

The control apparatus 42 of the first work vehicle may determine whether the first work vehicle itself is unable to travel. The control apparatus 42 of the first work vehicle may, for example, determine whether the first work vehicle itself is unable to travel based on information detected by a detector of the first work vehicle. The control apparatus 42 of the first work vehicle may, for example, determine whether the first work vehicle itself is unable to travel based on an image of the first work vehicle itself, or an image of the surroundings of the first work vehicle, captured by the imaging apparatus 44 of the first work vehicle.

In a case in which the first work vehicle is unable to travel, the control apparatus 42 of the first work vehicle may provide notification, that the first work vehicle is unable to travel, to the information processing apparatus 10. in a case in which the first work vehicle is unable to travel, the control apparatus 42 of the first work vehicle may provide notification, that the first work vehicle is unable to travel, to the rescue vehicle. The control apparatus 42 of the first work vehicle may provide notification, that the first work vehicle is unable to travel, to a rescue vehicle that is another work vehicle 40 located less than a predetermined distance from a position at which the first work vehicle became unable to travel. The control apparatus 42 of the first work vehicle may provide notification, that the first work vehicle is unable to travel, to a rescue vehicle that is a work vehicle 40 registered in advance.

Conversely, the control apparatus 42 of the first work vehicle can be notified by the second work vehicle, which is a work vehicle other than the first work vehicle, that the second work vehicle is unable to travel. The control apparatus 42 of the first work vehicle may control the first work vehicle to travel to a position at which the second work vehicle became unable to travel in a case in which the control apparatus 42 is notified that the second work vehicle is unable to travel. The control apparatus 42 of the first work vehicle may control the first work vehicle to rescue the second work vehicle.

As described above, by the work vehicles 40 providing notification to each other, rescue or another such response can be achieved quickly or easily for a work vehicle 40 that is unable to travel. Consequently, technology for rescuing a work vehicle 40 that has become unable to travel can be improved.

<Example Procedures for Information Processing Method>

Figure 3:
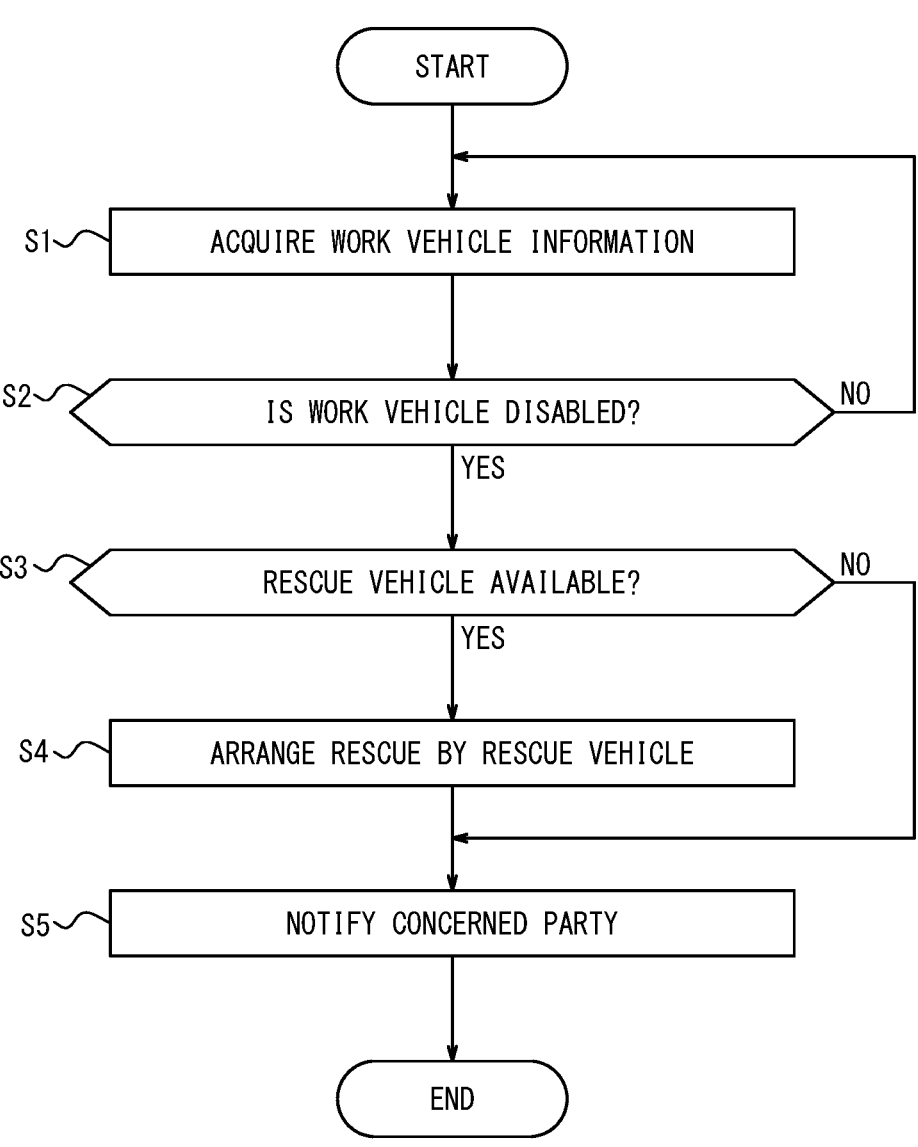
FIG. 3 is a flowchart illustrating an example procedure for an information processing method to be executed by an information processing apparatus according to an embodiment.

The controller 12 of the information processing apparatus 10 according to the present embodiment may perform an information processing method including the procedures of the flowchart in FIG. 3, for example, to manage the status of the work vehicle 40. The information processing method may be implemented as an information processing program to be executed by the controller 12. The information processing program may be stored on a non-transitory computer readable medium.

The controller 12 acquires work vehicle information (step S1). The controller 12 determines whether the work vehicle 40 is unable to travel based on the work vehicle information (step S2). In a case in which the work vehicle 40 is not unable to travel (step S2: NO), the controller 12 returns to the procedure in step S1. In a case in which the work vehicle 40 is unable to travel (step S2: YES), the controller 12 determines whether a rescue vehicle for rescuing the work vehicle 40 that is unable to travel is available (step S3). In a case in which no rescue vehicle is available (step S3: NO), the controller 12 proceeds to step S5. In a case in which a rescue vehicle is available (step S3: YES), the controller 12 arranges rescue of the work vehicle 40 by the rescue vehicle (step S4). The controller 12 provides notification that the work vehicle 40 is unable to travel to the concerned party for the work vehicle 40 that is unable to travel (step S5). After executing the procedure in step S5, the controller 12 ends the execution of the procedures in the flowchart of FIG. 3.

Figure 4:
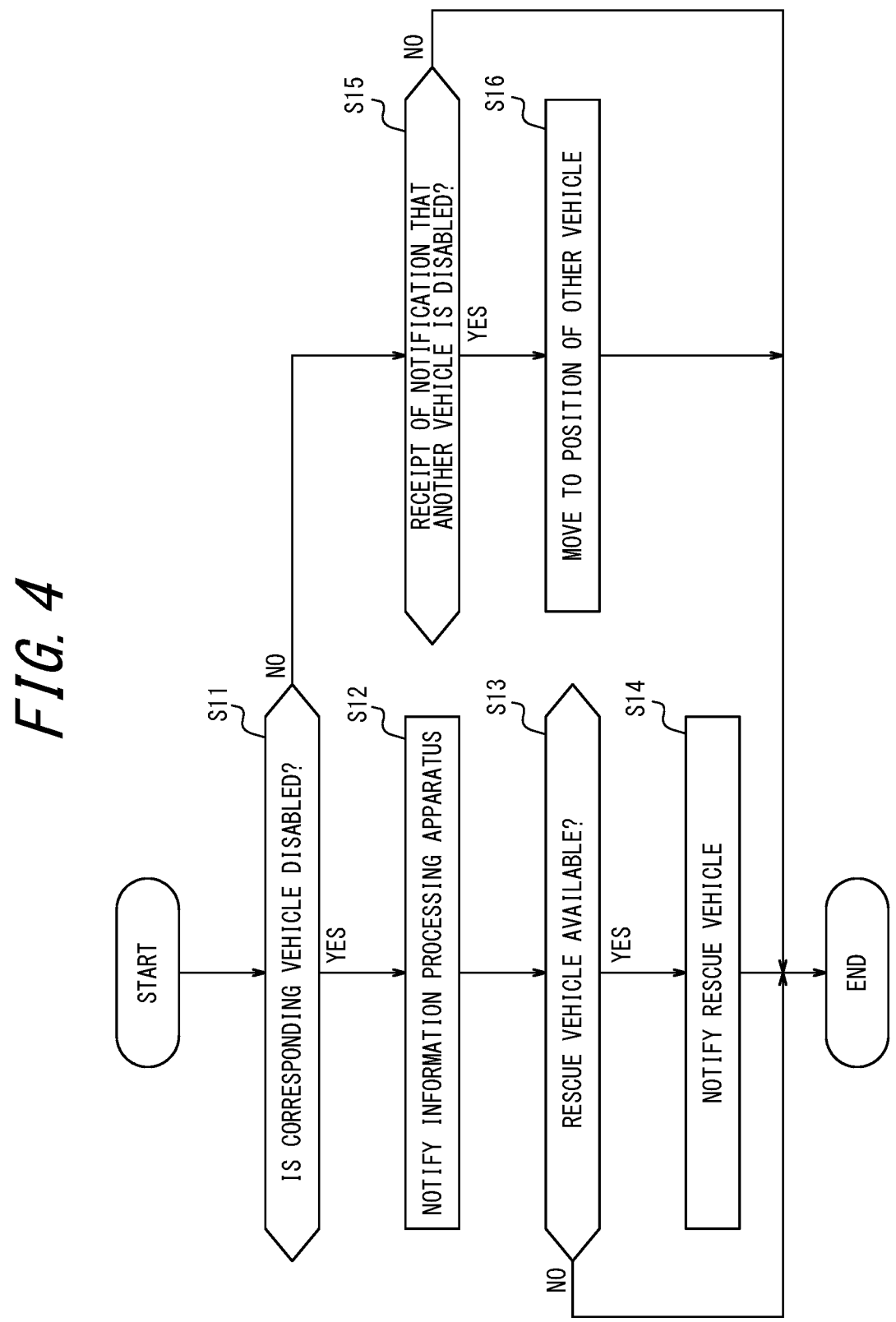
FIG. 4 is a flowchart illustrating an example procedure for an information processing method to be executed by a control apparatus according to an embodiment.

The control apparatus 42 of the work vehicle 40 according to the present embodiment may perform an information processing method including the procedures of the flowchart in FIG. 4, for example, for work vehicles 40 to provide notification to each other in a case in which a work vehicle 40 becomes unable to travel. The information processing method may be implemented as an information processing program to be executed by the control apparatus 42. The information processing program may be stored on a non-transitory computer readable medium.

The control apparatus 42 determines whether the work vehicle 40 itself in which the control apparatus 42 is mounted (the corresponding vehicle) has become unable to travel (step S11). In a case in which the corresponding vehicle is not unable to travel (step S11: NO), the control apparatus 42 proceeds to step S15. In a case in which the corresponding vehicle is unable to travel (step S11: YES), the control apparatus 42 provides notification, that the corresponding vehicle is unable to travel, to the information processing apparatus 10 (step S12). The control apparatus 42 determines whether a rescue vehicle for rescuing the corresponding vehicle is available (step S13). In a case in which a rescue vehicle is available (step S13: YES), the control apparatus 42 provides notification, that the corresponding vehicle is unable to travel, to the rescue vehicle (step S14). After executing the procedure in step S14, the control apparatus 42 ends the execution of the procedures in the flowchart of FIG. 4. In a case in which no rescue vehicle is available (step S13: NO), the control apparatus 42 ends the procedures of the flowchart in FIG. 4. In a case in which the corresponding vehicle is unable to travel and no rescue vehicle is available, the control apparatus 42 may keep the corresponding vehicle on standby for a rescue arranged by the information processing apparatus 10. The control apparatus 42 may repeat the procedures for determining whether a rescue vehicle is available while keeping the corresponding vehicle on standby.

The control apparatus 42 determines whether notification that another work vehicle 40 (other vehicle) is unable to travel has been received (step S15). In a case in which notification that another vehicle is unable to travel has been received (step S15: YES), the control apparatus 42 controls the corresponding vehicle to move to the position where the other vehicle became unable to travel (step S16) in order to rescue the other vehicle. In a case in which notification that another vehicle is unable to travel has not been received (step S15: NO), the control apparatus 42 ends the procedures of the flowchart in FIG. 4.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the information processing apparatus 10 in the above embodiment are distributed to multiple computers capable of communicating with each other can be implemented. For example, an embodiment in which some of the functions of the information processing apparatus 10 are provided in the control apparatus 42, the image acquisition apparatus 20, or the like can also be implemented.

For example, an embodiment in which a general purpose computer functions as the information processing apparatus 10 according to the above embodiment can also be implemented. Specifically, a program in which processes for realizing the functions of the information processing apparatus according to the above embodiment are written may be stored in a memory of a general purpose computer, and the program may be read and executed by a processor. Accordingly, the present disclosure can also be implemented as a program executable by a processor, or a non-transitory computer readable medium storing the program.

Examples of some embodiments of the present disclosure are described below. However, it should be noted that the embodiments of the present disclosure are not limited to these examples.

[Appendix 1] An information processing apparatus comprising a controller configured to manage a status of a work vehicle, wherein the controller is configured to determine whether the work vehicle is unable to travel based on information about the work vehicle, and provide notification, to a notification target, that the work vehicle is unable to travel in a case in which the work vehicle is determined to be unable to travel.

[Appendix 2] The information processing apparatus according to appendix 1, wherein the controller is configured to determine whether the work vehicle became unable to travel while working or while traveling off a public road.

[Appendix 3] The information processing apparatus according to appendix 1 or 2, wherein the work vehicle is an agricultural vehicle for performing agricultural work.

[Appendix 4] The information processing apparatus according to any one of appendices 1 to 3, wherein the controller is configured to estimate conditions when the work vehicle became unable to travel based on the information about the work vehicle.

[Appendix 5] The information processing apparatus according to any one of appendices 1 to 4, wherein the controller is configured to acquire positional information for the work vehicle as the information about the work vehicle and determine whether the work vehicle is unable to travel based on the positional information for the work vehicle.

[Appendix 6] The information processing apparatus according to any one of appendices 1 to 5, wherein the controller is configured to acquire an image of the work vehicle as the information about the work vehicle and determine whether the work vehicle is unable to travel based on the image of the work vehicle.

[Appendix 7] The information processing apparatus according to appendix 6, wherein the controller is configured to control an image acquisition apparatus to cause the image acquisition apparatus to capture the image of the work vehicle.

[Appendix 8] The information processing apparatus according to any one of appendices 1 to 7, wherein the controller is configured to cause a rescue tool for the work vehicle, the rescue tool being estimated based on the information about the work vehicle, to be transported by another work vehicle to a position at which the work vehicle became unable to travel.

[Appendix 9] The information processing apparatus according to any one of appendices 1 to 8, wherein the controller is configured to provide notification, that the work vehicle is unable to travel, to an owner, a manager, or a concerned party of the work vehicle as the notification target.

[Appendix 10] The information processing apparatus according to any one of appendices 1 to 9, wherein the controller is configured to provide notification, that the work vehicle is unable to travel, to a rescue vehicle as the notification target, the rescue vehicle being another work vehicle located less than a predetermined distance from a position at which the work vehicle became unable to travel.

[Appendix 11] The information processing apparatus according to any one of appendices 1 to 9, wherein the controller is configured to provide notification, that the work vehicle is unable to travel, to a rescue vehicle as the notification target, the rescue vehicle being a work vehicle registered in advance.

[Appendix 12] The information processing apparatus according to appendix 10 or 11, wherein the controller is configured to control the rescue vehicle to move to the position at which the work vehicle became unable to travel.

[Appendix 13] An information processing system comprising: the information processing apparatus according to any one of appendices 1 to 12; and a control apparatus mounted on a work vehicle.

[Appendix 14] An information processing method to be executed by an information processing apparatus configured to manage a status of a work vehicle, the information processing method comprising: determining whether the work vehicle is unable to travel based on information about the work vehicle; and providing notification, to a notification target, that the work vehicle is unable to travel in a case in which the work vehicle is determined to be unable to travel.

[Appendix 15] The information processing method according to appendix 14, further comprising determining whether the work vehicle became unable to travel while working or while traveling off a public road.

[Appendix 16] The information processing method according to appendix 14 or 15, further comprising estimating conditions when the work vehicle became unable to travel based on the information about the work vehicle.

[Appendix 17] The information processing method according to any one of appendices 14 to 16, further comprising: providing notification, that the work vehicle is unable to travel, to a rescue vehicle that is another work vehicle located less than a predetermined distance from a position at which the work vehicle became unable to travel, or a rescue vehicle that is a work vehicle registered in advance, as the notification target; and controlling the rescue vehicle to move to the position at which the work vehicle became unable to travel.

[Appendix 18] A control apparatus for controlling a first work vehicle, wherein in a case in which the first work vehicle is unable to travel, the control apparatus is configured to provide notification to an information processing apparatus that the first work vehicle is unable to travel, the information processing apparatus being configured to manage the first work vehicle.

[Appendix 19] The control apparatus according to appendix 18, wherein in a case in which the first work vehicle is unable to travel, the control apparatus is configured to provide notification, that the first work vehicle is unable to travel, to a rescue vehicle that is another work vehicle located less than a predetermined distance from a position at which the first work vehicle became unable to travel, or a rescue vehicle that is a work vehicle registered in advance.

[Appendix 20] The control apparatus according to appendix 18 or 19, wherein in a case in which notification that a second work vehicle that is a work vehicle other than the first work vehicle is unable to travel is provided by the information processing apparatus, the control apparatus is configured to control the first work vehicle to travel to a position at which the second work vehicle became unable to travel.

The invention claimed is:

1. An information processing apparatus comprising a controller configured to manage a status of a work vehicle, wherein the controller is configured to determine whether the work vehicle is unable to travel based on information about the work vehicle, and provide notification, to a notification target, that the work vehicle is unable to travel in a case in which the work vehicle is determined to be unable to travel, and cause a rescue tool for the work vehicle, the rescue tool being estimated based on the information about the work vehicle, to be transported by another work vehicle to a position at which the work vehicle became unable to travel.

2. The information processing apparatus according to claim 1, wherein the controller is configured to determine whether the work vehicle became unable to travel while working or while traveling off a public road.

3. The information processing apparatus according to claim 2, wherein the work vehicle is an agricultural vehicle for performing agricultural work.

4. The information processing apparatus according to claim 1, wherein the controller is configured to estimate conditions when the work vehicle became unable to travel based on the information about the work vehicle.

5. The information processing apparatus according to claim 1, wherein the controller is configured to acquire positional information for the work vehicle as the information about the work vehicle and determine whether the work vehicle is unable to travel based on the positional information for the work vehicle.

6. The information processing apparatus according to claim 1, wherein the controller is configured to acquire an image of the work vehicle as the information about the work vehicle and determine whether the work vehicle is unable to travel based on the image of the work vehicle.

7. The information processing apparatus according to claim 6, wherein the controller is configured to control an image acquisition apparatus to cause the image acquisition apparatus to capture the image of the work vehicle.

8. The information processing apparatus according to claim 1, wherein the controller is configured to provide notification, that the work vehicle is unable to travel, to an owner, a manager, or a concerned party of the work vehicle as the notification target.

9. The information processing apparatus according to claim 1, wherein the controller is configured to provide notification, that the work vehicle is unable to travel, to a rescue vehicle as the notification target, the rescue vehicle being another work vehicle located less than a predetermined distance from a position at which the work vehicle became unable to travel.

10. The information processing apparatus according to claim 9, wherein the controller is configured to control the rescue vehicle to move to the position at which the work vehicle became unable to travel.

11. The information processing apparatus according to claim 1, wherein the controller is configured to provide notification, that the work vehicle is unable to travel, to a rescue vehicle as the notification target, the rescue vehicle being a work vehicle registered in advance.

12. An information processing system comprising:

the information processing apparatus according to claim 1; and a control apparatus mounted on a work vehicle.

13. An information processing method to be executed by an information processing apparatus configured to manage a status of a work vehicle, the information processing method comprising:

determining whether the work vehicle is unable to travel based on information about the work vehicle; and providing notification, to a notification target, that the work vehicle is unable to travel in a case in which the work vehicle is determined to be unable to travel, causing a rescue tool for the work vehicle, the rescue tool being estimated based on the information about the work vehicle, to be transported by another work vehicle to a position at which the work vehicle became unable to travel.

14. The information processing method according to claim 13, further comprising determining whether the work vehicle became unable to travel while working or while traveling off a public road.

15. The information processing method according to claim 13, further comprising estimating conditions when the work vehicle became unable to travel based on the information about the work vehicle.

16. The information processing method according to claim 13, further comprising:

providing notification, that the work vehicle is unable to travel, to a rescue vehicle that is another work vehicle located less than a predetermined distance from a position at which the work vehicle became unable to travel, or a rescue vehicle that is a work vehicle registered in advance, as the notification target; and controlling the rescue vehicle to move to the position at which the work vehicle became unable to travel.

* * * * *